United States Patent
Masumoto (10) Patent No.: US 6,562,898 B2
(45) Date of Patent: May 13, 2003

(54) RESIN COMPOSITION AND MANUFACTURING METHOD THEREFOR

(76) Inventor: Katsuhisa Masumoto, 12-66 Nakamiyayamato-cho, Hirakata-shi, Osaka, 573-0011 (JP)

(*) Notice: Subject to any disclaimer, the term of this patent is extended or adjusted under 35 U.S.C. 154(b) by 26 days.

(21) Appl. No.: 09/759,942

(22) Filed: Jan. 11, 2001

(65) Prior Publication Data

US 2002/0028873 A1 Mar. 7, 2002

(51) Int. Cl.⁷ .................................................. C08K 3/00
(52) U.S. Cl. ...................... 524/580; 524/580; 427/2.24; 427/2.25; 623/1.43; 623/1.18
(58) Field of Search .................. 524/580; 427/2.24, 427/2.25; 623/1.43, 1.18

(56) References Cited

U.S. PATENT DOCUMENTS

| | | | | |
|---|---|---|---|---|
| 5,340,614 A | * | 8/1994 | Perman et al. | 427/2.24 |
| 5,386,055 A | * | 1/1995 | Lee et al. | 210/180 |
| 5,624,704 A | * | 4/1997 | Darouiche et al. | 427/2.24 |
| 6,120,536 A | * | 9/2000 | Ding et al. | 424/424 |
| 6,451,153 B1 | * | 9/2002 | Symons | 156/276 |

FOREIGN PATENT DOCUMENTS

JP        10-087840        4/1998

* cited by examiner

*Primary Examiner*—David W. Wu
*Assistant Examiner*—Henry S. Hu
(74) *Attorney, Agent, or Firm*—Pitney, Hardin, Kipp & Szuch LLP (57) ABSTRACT

The present invention relates to resin composition with superior antioxidant properties, mechanical strength and insulating properties. A mixture of a thermoplastic resin in pellet or granular form and water is heated under pressure at a subcritical condition of the water to melt the thermoplastic resin, and the melted resin is cooled.

14 Claims, 6 Drawing Sheets

(1st Step)  Mix and Stir Resin Pellets and EM-X Water (2nd Step)  Melt Resin Pellets Under Subcritical Conditions of Water (3rd Step)  Rapidly Cool the Melted Resin in Water

RESIN COMPOSITION AND MANUFACTURING METHOD THEREFOR

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention relates to a resin composition with superior antioxidant properties, as well as mechanical strength and insulating properties.

The present inventors proposed a certain type of resin composition in Japanese Unexamined Patent Application Disclosure (Kokai) No. 10-87840. There, a thermoplastic resin was wetted in water with an oxidation-reduction potential of between −420 mV and 200 mV and the wet thermoplastic resin was melted under heat and pressure to form an antioxidizing resin. The thermoplastic resin was melted at a temperature between 170° C. and 250° C. under pressure ranging between 5 and 30 MPa. Low molecular antioxidant substances produced by a group of effective microorganisms were mixed in with the −420 mV to 200 mV water.

This antioxidizing resin is ideal in film for wrapping food products and containers for storing food products because of the good oxidation-inhibiting effect of the resin on vegetables, fruits, grains, meats and fish. However, when this resin was used for large containers, such as containers used for transporting food products or tanks for storing drinking water, the resin maintained its superior antioxidizing properties but did not exhibit sufficient mechanical strength for manufacturing large containers.

SUMMARY

An object of the present invention is to obtain a resin composition with superior antioxidant properties, mechanical strength and insulating properties.

According to one embodiment of the present invention, the thermoplastic resin of the present invention is formed by melting a mixture of a thermoplastic resin in pellet or granular form and purified water or distilled water with the impurities removed. The melting is performed by using heat and pressure under a subcritical condition of water. The melted resin is then cooled by, for example, using cold water with the impurities removed.

According to another embodiment of the present invention, the thermoplastic resin of the present invention is formed by melting a mixture of a thermoplastic resin in pellet or granular form and natural unchanged water. The melting is performed by using heat and pressure under a subcritical condition of water. The melted resin is then cooled by, for example, using cold water with the impurities removed.

According to a further embodiment of the present invention, the thermoplastic resin of the present invention is formed by melting a mixture of a thermoplastic resin in pellet or granular form and purified water or distilled water containing antioxidizing substances produced by groups of effective microorganisms. The melting is performed by using heat and pressure under a subcritical condition of water. The melted resin is then cooled by, for example, using cold water with the impurities removed.

Preferably, the thermoplastic resin is polyethylene or polypropylene; however, the present invention is not restricted to these two types of resin.

One method for manufacturing a resin composition of the present invention comprises a first stage wherein a thermoplastic resin in pellet or granular form is mixed and stirred in purified water or distilled water with the impurities removed; a second stage wherein the mixture is heated and pressurized under a subcritical condition of water and the thermoplastic resin is melted; and a third stage wherein the melted resin obtained in the second stage is cooled using cold water with the impurities removed.

Alternatively, in the first stage, the thermoplastic resin in pellet or granular form may be mixed and stirred in natural unchanged water, or in purified water, or distilled water containing antioxidizing substances produced by groups of effective microorganisms.

The purified water with impurities removed refers to tap water filtered using ceramics, activated charcoal or any other means known in the art to remove impurities such as chlorine. The distilled water refers to tap water distilled to remove impurities such as chlorine. The natural unchanged water refers to water containing minerals such as, for example, deep ocean water, mineral water and anionic mineral water. The purified or distilled water containing antioxidizing substances produced by groups of effective microorganisms refers to purified water or distilled water containing a small amount of antioxidizing substances. Preferably, it is a mix of a small amount of antioxidizing substances produced by groups of effective microorganisms (1 to 5 ppw antioxidizing substances per 100 ppw purified water) and tap water dechlorinated using ceramics.

Preferably, the thermoplastic resin raw material is polyolefin resin such as, for example, polyethylene or polypropylene. However, the present invention is not restricted to these two types of resin. Other examples include polystyrene (PS), AS resin, ABS resin, methacrylic resin (PMMA), polyamide (PA), polycarbonate (PC), polyethylene terephthalate (PET), polybutylene terephthalate (PBT), ionomer (IO), polyvinyl butyral (PVB), polyvinyl alcohol (PVA), polyacetal (POM), polyphenylene oxide (PPO), polyphenylene sulfide (PPS), polyether ether ketone (PEEK), fluorine-based resins (PFA, ETFE, etc.), polyimide (PI), polyarylate (PAR), polysulfone (PSU), polyether sulfone (PES), polyether imide (PEI), polyimide (PAI), polyurethane (PU) and cellulose-based resins such as acetyl cellulose and cellulose acetate butylate.

The resin pellets are melted by heat and pressure under a subcritical condition of water. Subcritical conditions of water refers to a state below the critical point of water (374° C. and 22 MPa). The melting conditions depend on the type of thermoplastic resin, but in general, when an extruder is used, the thermoplastic resins may be melted under a pressure range of between 10 and 22 MPa (preferably between 15 and 22 MPa) and at a temperature range of between 150 and 370° C. (preferably between 200 and 250° C.).

Groups of effective microorganisms that produce antioxidizing substances are generally a group of more than 80 species of microorganism in 10 genuses of diffferent functions, which are known as "effective microorganisms (EM)". The principal types of bacteria are photosynthetic bacteria, lactic acid bacteria, yeasts and mycobacteria. (See Akio Hiyoshi, "The EM Encyclopedia: How the EM Environmental Revolution Will Change Human Life", Sogo Unicom Co., Ltd., No. 282, p. 283.) The low molecular antioxidizing substances produced by EM are known as "EM-X". The EM-X are manufactured by fermenting plant material or seaweed using EM, removing the oxides using ozone, and removing the residues and microorganisms using various filters. EM-X comprises many different kinds of plant-derived or microorganism-derived antioxidizing substances.

The preferred ratio of mixing the thermoplastic resin in pellet or grain form (hereinafter referred to as resin pellets) and water is 1 to 5 ppw water per 100 ppw resin pellets. If less than 1 ppw or more than 5 ppw water is added, a resin composition with superior antioxidizing properties cannot be obtained.

It is clear from the physical property testing to be explained below that the resin compositions of the present invention have superior mechanical strength and insulating properties, and it is clear from the test data in the embodiment to be described below that the resin compositions of the present invention prevent oxidation. It is believed that melting the resin pellets at a subcritical condition of water improves the hydrophobic properties of the resin compositions (Physical Property Test No. 2), but the theoretical mechanism is not understood.

The present inventors were able to verify that the physical properties of the resin compositions in the present invention were not changed by the heat and pressure that are present during usual product molding processes. In other words, the physical properties of the resin compositions in the present invention were not changed when the pellets were molded (e.g., propylene melted at 200° C.) and processed into containers or wrapping for food products.

Therefore, using the resin compositions of the present invention as molding material for containers and sheets prevents putrefaction or denaturing of the contents of the containers and allows the container to withstand heavy loads. For example, containers molded from the resin compositions of the present invention preserve fresh foods much longer than containers made from conventional resin compositions. Also, large containers for transporting foods and tanks for drinking water could also be molded using the resin compositions of the present invention, unlike the previous resin compositions. The resin composition of the present invention also can be used as a liner of a refrigerator, so that the refrigerator has a superior ability to keep fresh foods from spoiling. Because of improved mechanical strength, the resin compositions of the present invention can be used in situations requiring long-term use, such as liners for pipes. Because of improved electrical resistance and insulation breakdown strength, the resin compositions of the present invention also can be used to coat electric wires. If the resin compositions are made using non-chlorine resins such as polyethylene and polypropylene, development of dioxins can be prevented at the time of waste disposal.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

EXAMPLE 1

A Method for Manufacturing Thermoplastic Resin

Figure 1:
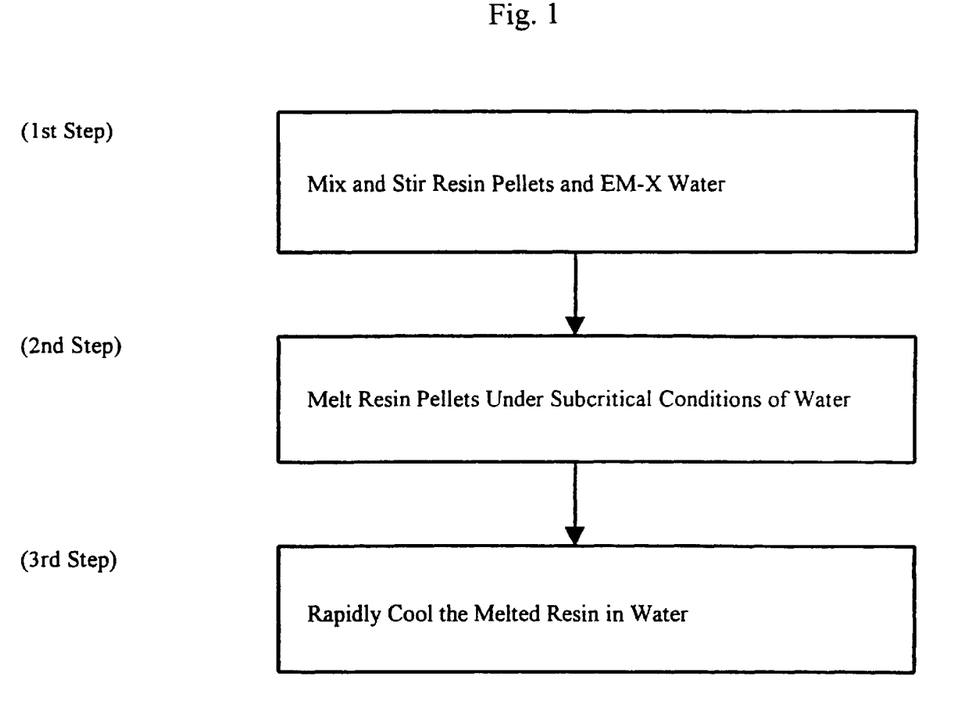
FIG. 1 is a diagram of the manufacturing stages for the resin composition of the present invention.

As shown in FIG. 1, there are three stages in the manufacturing process for the resin compositions of the present invention. In the preferred embodiment, mono-axial extruder (Monoaxial 65-36V manufactured by Osaka Precision Equipment Co., Ltd.) was used in the manufacturing process. In Stage 1, polyethylene resin pellets (specific gravity 0.91 to 0.93), which are raw material, are mixed with EM-X water in a hopper of the extruder and stirred for 20 to 30 minutes. Preferably, the compositional ratio is 1 kg of EM-X water per 100 kg of resin pellets. Preferably, the EM-X water is a trace amount of EM-X mixed into tap water dechlorinated using ceramics.

In Stage 2, the mixture of polyethylene resin pellets and EM-X water is added to a cylinder and said resin pellets are heated and melted inside the cylinder at a temperature between 200 and 250° C. Also, the extrusion speed is adjusted under said temperature conditions so that the pressure inside the cylinder is between 10 and 22 MPa. The pressure and temperature conditions inside the cylinder satisfy a subcritical condition of water.

In Stage 3, the melted resin obtained in Stage 2 is rapidly cooled in cold water with the impurities removed. At this time, the melted resin is rapidly cooled while being stretched into the shape of vermicelli. The hardened vermicelli-shaped resin is then cut into chips. These chips are the resin composition of the present invention. The extrusion speed (discharge rate) is 60 to 140 kg/hr, the extrusion pressure (rotational) is 200 to 250 rpm, and the length of the cooling layer is 3 to 4 m. The resin composition is chip-shaped because it is easier to use when molding into films or containers. Thus, the resin composition does not have to be chip-shaped. Water with impurities removed, distilled water or natural unchanged water may be used instead of the EM-X water. Whether the raw material is polypropylene pellets or pellets of some other thermoplastic resin, the thermoplastic resin composition of the present invention can be obtained using the same method.

EXAMPLE 2

Physical Properties of a Resin Composition of the Present Invention

The following tests were conducted on a resin composition of the present invention (EMB) and a commercially available polypropylene synthetic resin (PP) to study the differences in their physical properties. In Test Nos. 1 through 10, EMB was in the form of a plate or sheet produced using a molding device by heating and melting (at 200° C.) the pellets of thermoplastic resin composition (propylene) obtained in said process using EM-X water. PP was in the form of a plate or sheet produced using a molding device by heating and melting (at 200° C.) ordinary polypropylene resin pellets. Therefore, the exact same manufacturing process was performed on the PP so that the only difference between the PP and the EMB was the resin composition. Also, a water quality test Test No. 11 was conducted on a water tank made from EMB (polyethylene) and a water tank made from ordinary polypropylene PP.

The eleven tests conducted were as follows:
1. Visual Inspection
2. Electron Microscope Observation (SEM Photography)
3. Melting Point Measurement
4. Contact Angle Measurement
5. Infrared Absorption Spectrum
6. Ultraviolet Absorption Spectrum
7. Mechanical Strength Test
8. Density Measurement
9. Electrical Resistance Measurement
10. Insulation Strength Measurement
11. Measurement of Water Quality in Tank 1. Visual Inspection When the surface was inspected with a naked eye, the EMB was transparent without any cloudiness whereas the PP was somewhat whitish. In the cutting test using scissors, the EMB was difficult to cut whereas the PP was easy to cut.

2. Electron Microscope Observation (SEM Photography)

The surface and cross-section of both samples were compared under a scanning electron microscope (NEC JSM-5410) at magnification factors between 35× and 3500×. No significant differences were detected. In the photographs of the surfaces of the samples taken at a magnification factor of 3500×, it is suspected that the EMB is a little finer.

3. Melting Point Measurement

In the melting point measurement, grains of EMB and PP were placed in test tubes. The test tubes were then placed in an oil bath. The EMB grains were cylindrical whereas the PP grains were bun-shaped. The melting point of the EMB was 148.5° C. with a rising rate of 0.5° C./min. The melting point of the PP was 165° C. with a rising rate of 0.3° C./min.

4. Contact Angle Measurement

The contact angle θ of purified water added dropwise to the surface of the EMB and PP was measured using a contact-angle meter manufactured by Kyowa Kaimen Kagaku Co., Ltd. The results are shown in Table 1.

TABLE 1

| PP (θ/2) | AVERAGE | θ | EMB (θ/2) | AVERAGE | θ |
|---|---|---|---|---|---|
| 38.0 |  |  | 44.9 |  |  |
| 37.4 | 37.6 | 75.2 | 44.9 | 45.1 | 89.8 |
| 37.3 |  |  | 45.5 |  |  |

The contact angle measurements for water were different. The cause is not understood, but it is verified that the EMB is clearly more hydrophobic than the PP. This difference is believed to have an effect on preventing water from traveling to the surface of the resin from a food product when fresh food is stored in a container made from the resin. It is also believed to have an effect on preventing putrefaction.

5. Ultraviolet Absorption Spectrum (UV Measurement)

The UV absorption spectrum wavelengths for EMB and PP film were measured using an ultraviolet absorption spectrum measuring device (UV-2100 manufactured by Shimazu Co., Ltd.). The results are shown in Table 2. A significant difference was not discovered.

TABLE 2

| No. | WAVELENGTH (nm) | VALUE (A) (Δ) |
|---|---|---|
| EMB | | |
| [[PEAK DATA]] | | |
| 1 | 271.5 | 1570 (0.293) |
| 2 | 219.5 | 3.655 (1.014) |
| [[VALLEY DATA]] | | |
| 1 | 251.0 | 1.334 (−1.126) |
| PP | | |
| [[PEAK DATA]] | | |
| 1 | 273.0 | 2.193 (0.122) |
| 2 | 225.0 | 3.991 (1.298) |
| [[VALLEY DATA]] | | |
| 1 | 249.5 | 1.595 (−1.455) |

6. Infrared Absorption Spectrum (FTIR)

A qualitative and quantitative analysis was performed on the EMB and the PP using a fourier transform infrared spectrophotometer (JIR-7000 manufactured by NEC Corporation). The samples were granular. (The EMB grains were cylindrical with a diameter of 2.4 mm, a height of 3.5 mm, and a thickness of 3.6 mm. The PP grains were tablets with a long diameter of 4.2 mm and a short diameter of 3.8 mm.) The results are shown in FIGS. 2 and 3.

Figure 2:
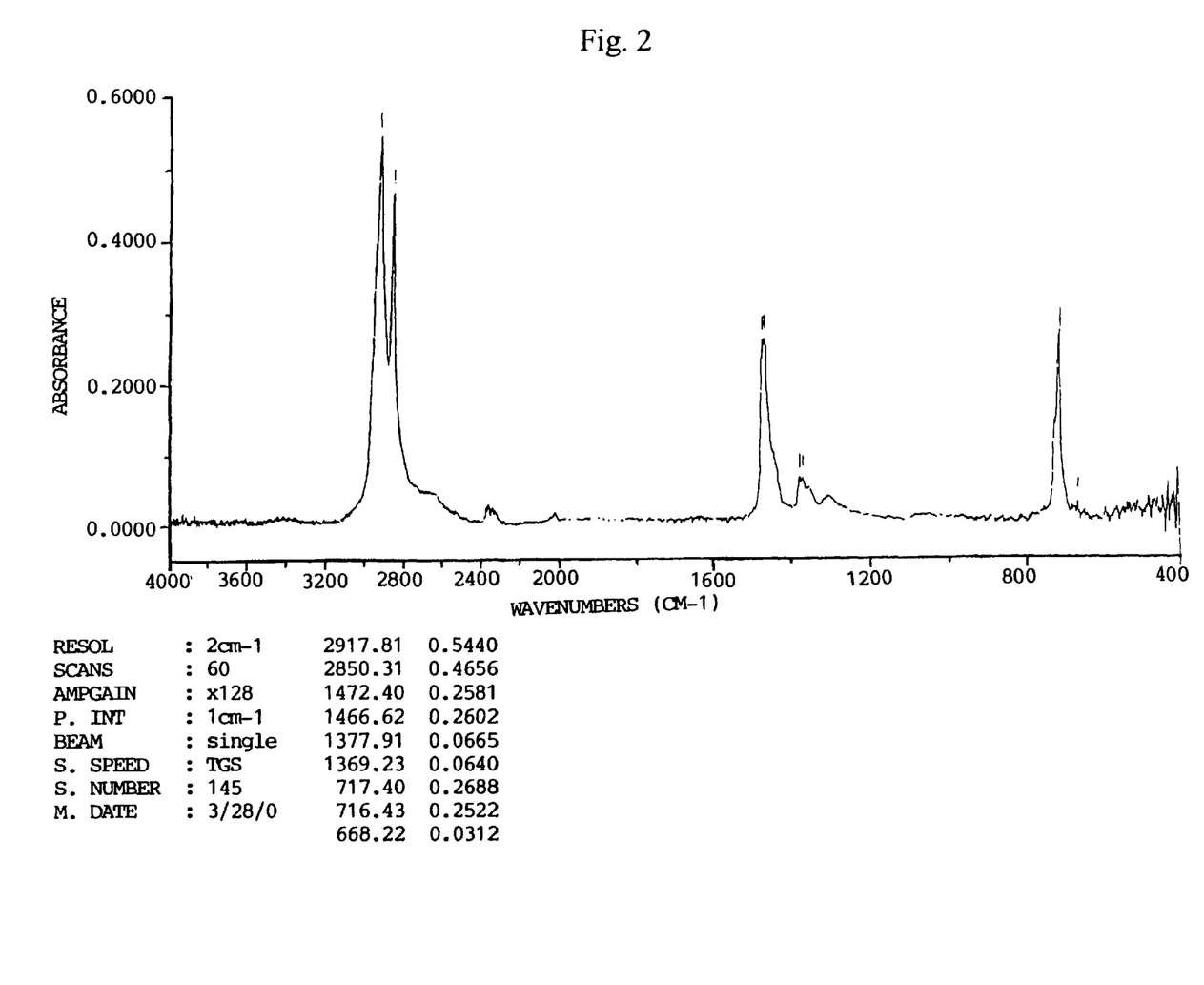
FIG. 2 is an infrared absorption spectrum for EMB.
Figure 3:
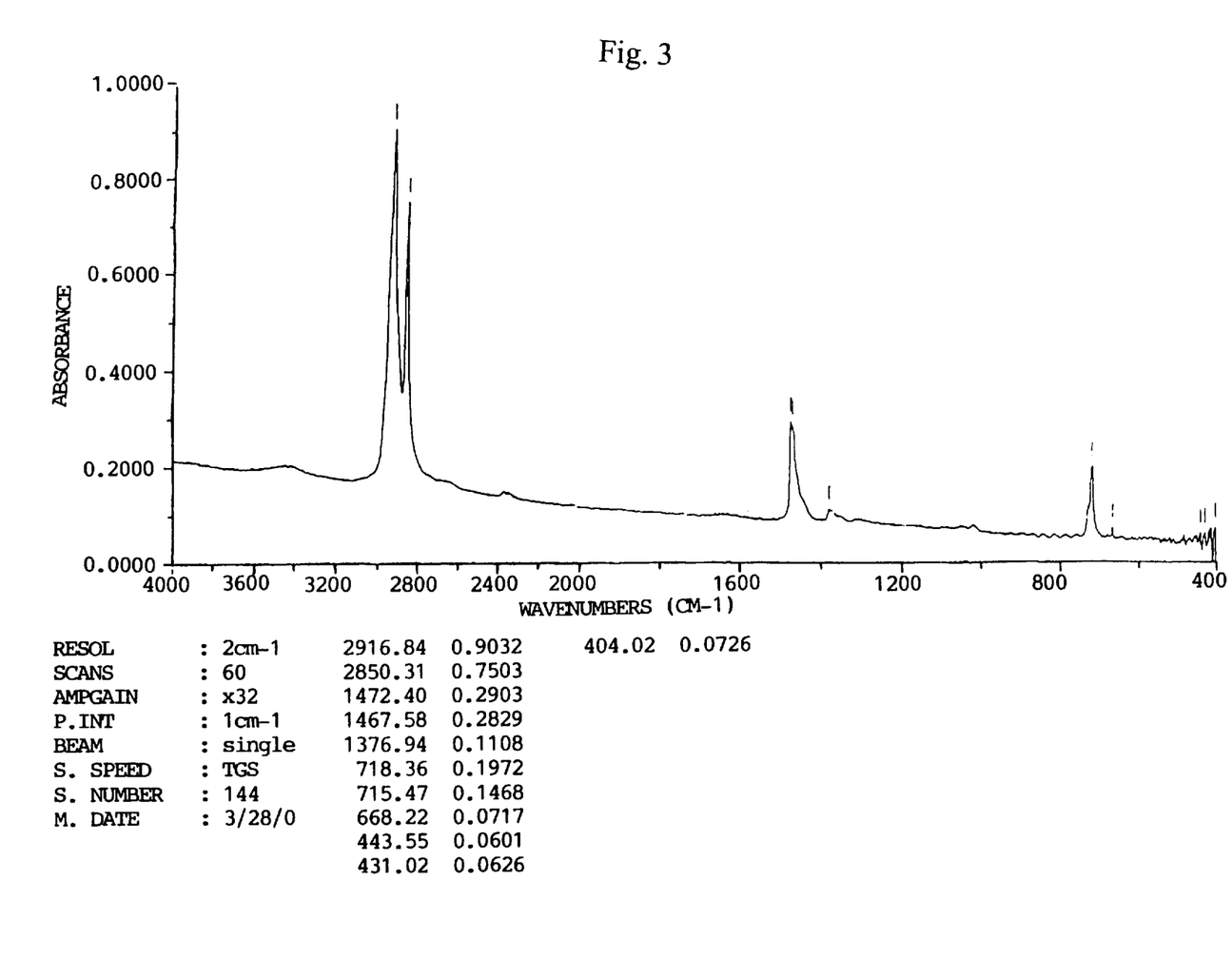
FIG. 3 is an infrared absorption spectrum for PP.

Both plastics had peaks at the same wavelengths as shown in FIGS. 2 and 3. This means that both plastics have the same constituents. However, all of the infrared absorption peaks were shorter in the EMB (FIG. 2) than in the PP (FIG. 3). It is believed that the EMB has a longer distance between oscillating atoms and a smaller partial load.

7. Mechanical Strength Test

Figure 4:
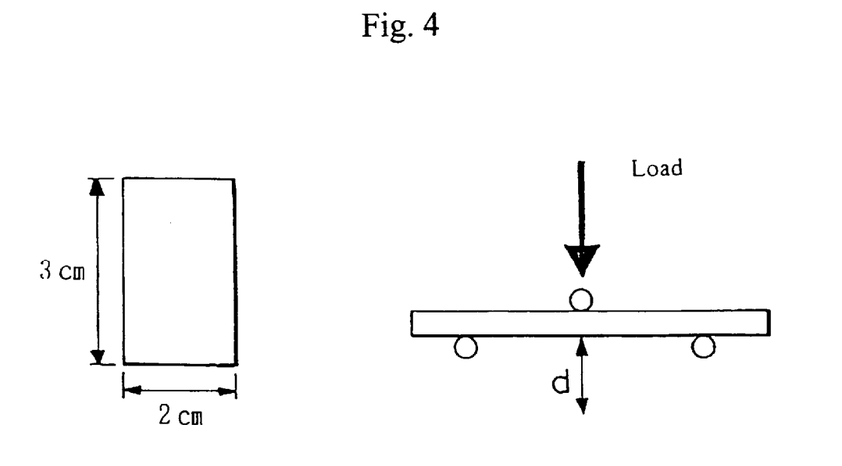
FIG. 4 is a diagram used to explain the mechanical strength testing method.

As shown in FIG. 4, samples of the EMB and PP were prepared with a width of 2 cm, a length of 3 cm, and a thickness of 2 mm. The samples were supported at two points and a load was applied to the center. The flexural distance (d) was used to evaluate the mechanical strength of the EMB and the PP. The results are shown in Table 5.

Figure 5:
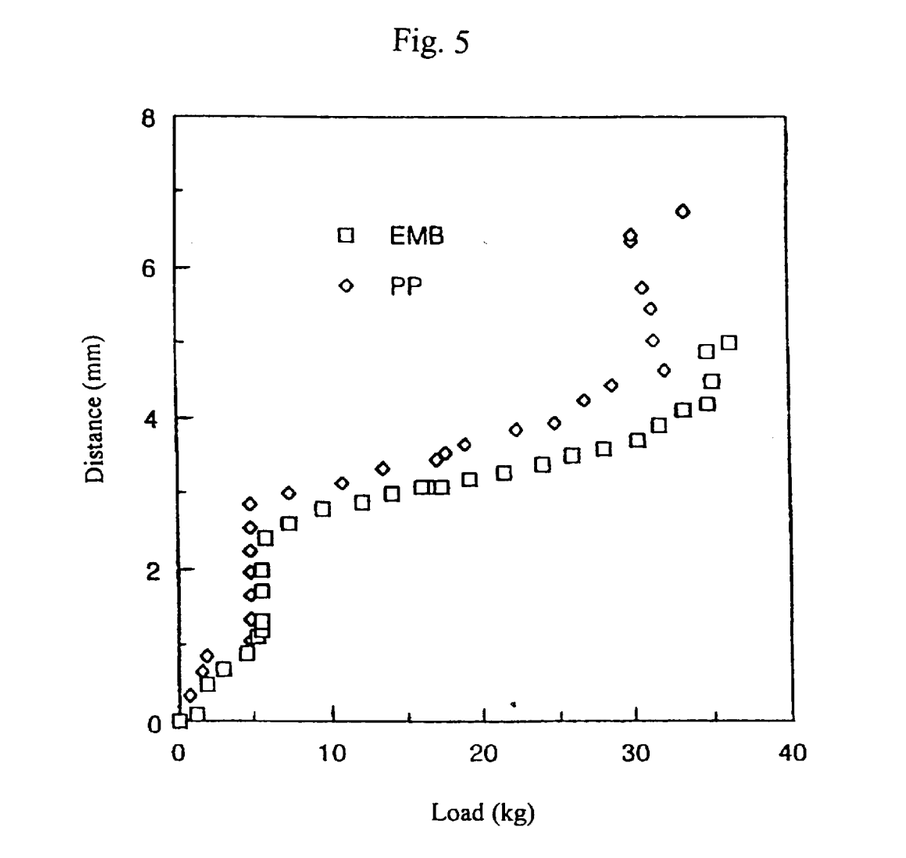
FIG. 5 is a graph of the results from the mechanical strength test performed on EMB and PP.

As shown in FIG. 5, both plastics were bent by a load in excess of 6 kg. The flexural distance (d) of the EMB was smaller than the flexural distance (d) of the PP when the load was greater than 25 kg. The difference was significant when the load was greater than 30 kg. Therefore, the EMB is considered to have more mechanical strength than the PP. This is an effective characteristic when making large containers.

8. Density Measurement

The volume of the samples was measured by using the change in volume during purification. The mass was then measured to an accuracy of 0.001 g using an electronic scale. The density of both samples was then compared. The results are shown in Table 3. No significant difference in density was discovered.

TABLE 3

|  | Weight (cm3) | PP + Wei. (cm3) | PP (g) | PP (g/cm3) | Enb. + Wei. (cm3) | Enb. (g) | Enb. (g/cm3) |
|---|---|---|---|---|---|---|---|
| Test 1 | 10.900 | 13.300 | 2.145 | 0.894 | 13.200 | 2.200 | 0.957 |

TABLE 3-continued

| | Weight (cm3) | PP + Wel. (cm3) | PP (g) | PP (g/cm3) | Enb. + Wei. (cm3) | Enb. (g) | Enb. (g/cm3) |
|---|---|---|---|---|---|---|---|
| Test 2 | 10.800 | 13.200 | 2.145 | 0.894 | 13.300 | 2.201 | 0.880 |
| Test 3 | 11.000 | 13.300 | 2.145 | 0.933 | 13.300 | 2.200 | 0.956 |
| Test 4 | 11.000 | 13.200 | 2.145 | 0.975 | 13.400 | 2.199 | 0.916 |
| Av | 10.925 | 13.250 | 2.145 | 0.924 | 13.300 | 2.200 | 0.927 |

9. Electric Resistance Measurement

Figure 6:
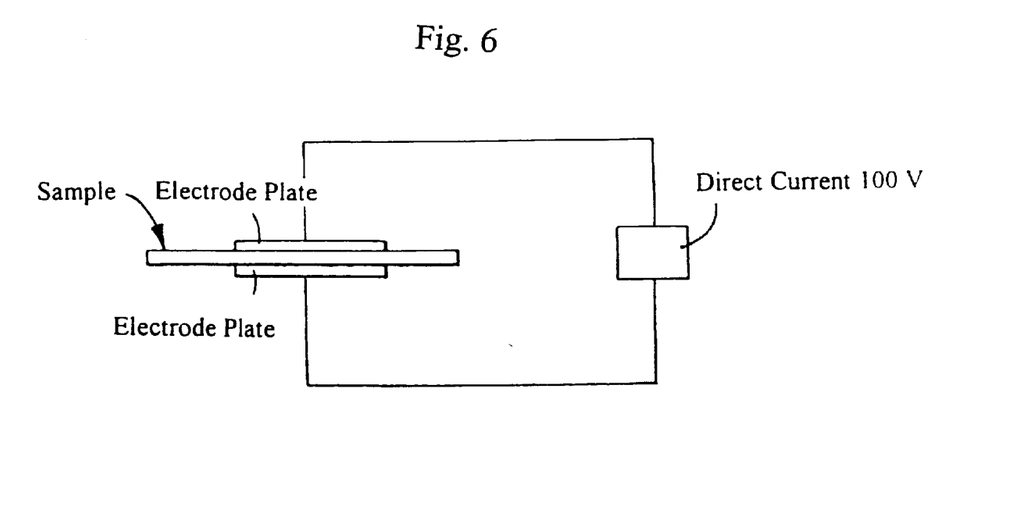
FIG. 6 is a diagram used to explain the electrical resistance testing method.

The electric resistance of both resins was measured by applying DC 100 V to a film sample interposed between an upper and lower electrode plate (80 mm×80 mm, thickness 100 microns) as shown in FIG. 6. The dielectric constant and dielectric loss tangent (tan δ) were also measured after DC 100 V had been applied to the sample for 10 minutes. The results are shown in Table 4.

TABLE 4

Electrical Resistance

| | PP | EMB |
|---|---|---|
| Electrical Resistance | $1.47 \times 10^{18}$ (Ω cm) | $2.20 \times 10^{18}$ (Ω cm) |
| Dielectric Constant | 2.65 | 2.61 |
| Dielectric Loss Tangent (tan δ) | 0.620 | 0.590 |

The electrical resistance of ordinary propylene is 1016 (Ωcm). In this test, the value was a somewhat higher 1018 (Ωcm). However, the EMB had a higher value. Under the same conditions, the electrical resistance of EMB was 1.5 times higher than PP. The exact cause is unknown, but it is believed that EMB's fineness (test 2, Electron Microscope Observation) and strength (test 7, Mechanical Strength Test) may have contributed to this effect. The dielectric constants and dielectric loss tangents (tan δ) were not significantly different.

10. Insulation Breakdown Strength Measurement

Figure 7:
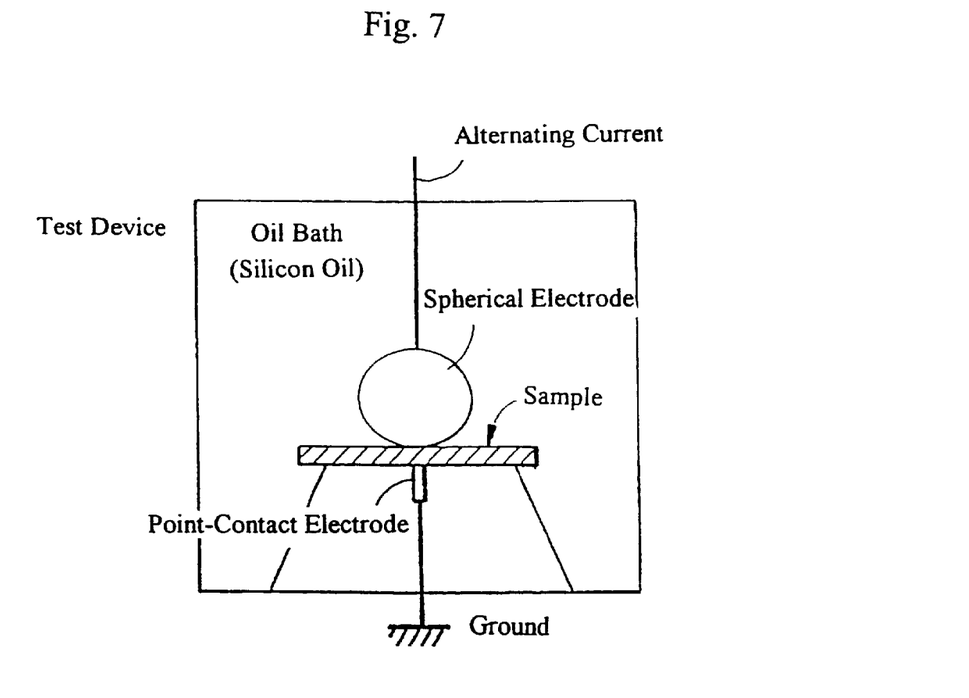
FIG. 7 is a diagram used to explain the insulation breakdown testing method.

As shown in FIG. 7, both samples (width 50 mm, length 50 mm, thickness 100 microns) were immersed in a silicon oil bath, and the insulation breakdown voltages were measured. A spherical electrode (diameter 10 mm) was placed on top of the sample, and the sample rested on a linear point-contact electrode. The linear electrode was connected to a ground to prevent an overload when the electricity was applied. The voltage of the current flowing between the spherical electrode and the ground wire was the insulation breakdown voltage. This test was performed 19 times to obtain a standard deviation. The results are shown in Table 5 and Table 6. The EMB was discovered to have superior insulating properties because the insulation breakdown voltage of the EMB (Table 5) was 1.2 times higher than the insulation breakdown voltage of the PP (Table 6).

TABLE 5

| THICKNESS (μm) | VOLTAGE (kv) | ELECTRIC FIELD (kv/mm) |
|---|---|---|
| 80 | 13 | 163 |
| 81 | 14 | 173 |
| 80 | 15 | 188 |
| 81 | 14 | 173 |
| 80 | 11 | 138 |
| 80 | 13 | 163 |
| 80 | 13 | 163 |
| 80 | 14 | 175 |
| 80 | 14 | 175 |
| 80 | 12 | 150 |
| 81 | 11 | 136 |
| 81 | 12 | 148 |
| 80 | 15 | 188 |
| 80 | 15 | 188 |
| 80 | 14 | 175 |
| 79 | 11 | 139 |
| 79 | 15 | 190 |
| 81 | 13 | 160 |
| 80 | 12 | 150 |
| AVERAGE THICKNESS (μm) | AVERAGE VOLTAGE (kv) | AVERAGE ELECTRIC FIELD (kv/mm) |
| 80 | 13 | 165 |
| THICKNESS STANDARD DEVIATION | VOLTAGE STANDARD DEVIATION | ELECTRIC FIELD STANDARD DEVIATION |
| 0.602140 | 1.39758 | 17.6464 |

TABLE 6

| THICKNESS (μm) | VOLTAGE (kv) | ELECTRIC FIELD (kv/mm) |
|---|---|---|
| 81 | 8 | 99 |
| 80 | 7 | 88 |
| 81 | 11 | 136 |
| 81 | 8 | 99 |
| 80 | 13 | 163 |
| 80 | 11 | 138 |
| 81 | 14 | 173 |
| 81 | 11 | 136 |
| 79 | 9 | 114 |
| 79 | 14 | 177 |
| 80 | 12 | 150 |
| 81 | 17 | 210 |
| 80 | 12 | 150 |
| 79 | 12 | 152 |
| 81 | 7 | 86 |
| 81 | 12 | 148 |
| 79 | 12 | 152 |
| 78 | 10 | 128 |
| 79 | 8 | 101 |
| AVERAGE THICKNESS (μm) | AVERAGE VOLTAGE (kv) | AVERAGE ELECTRIC FIELD (kv/mm) |
| 80 | 11 | 137 |
| THICKNESS STANDARD DEVIATION | VOLTAGE STANDARD DEVIATION | ELECTRIC FIELD STANDARD DEVIATION |
| 0.970320 | 2.65568 | 32.9902 |

11. Measurement of Water Quality in Tank

Figure 8:
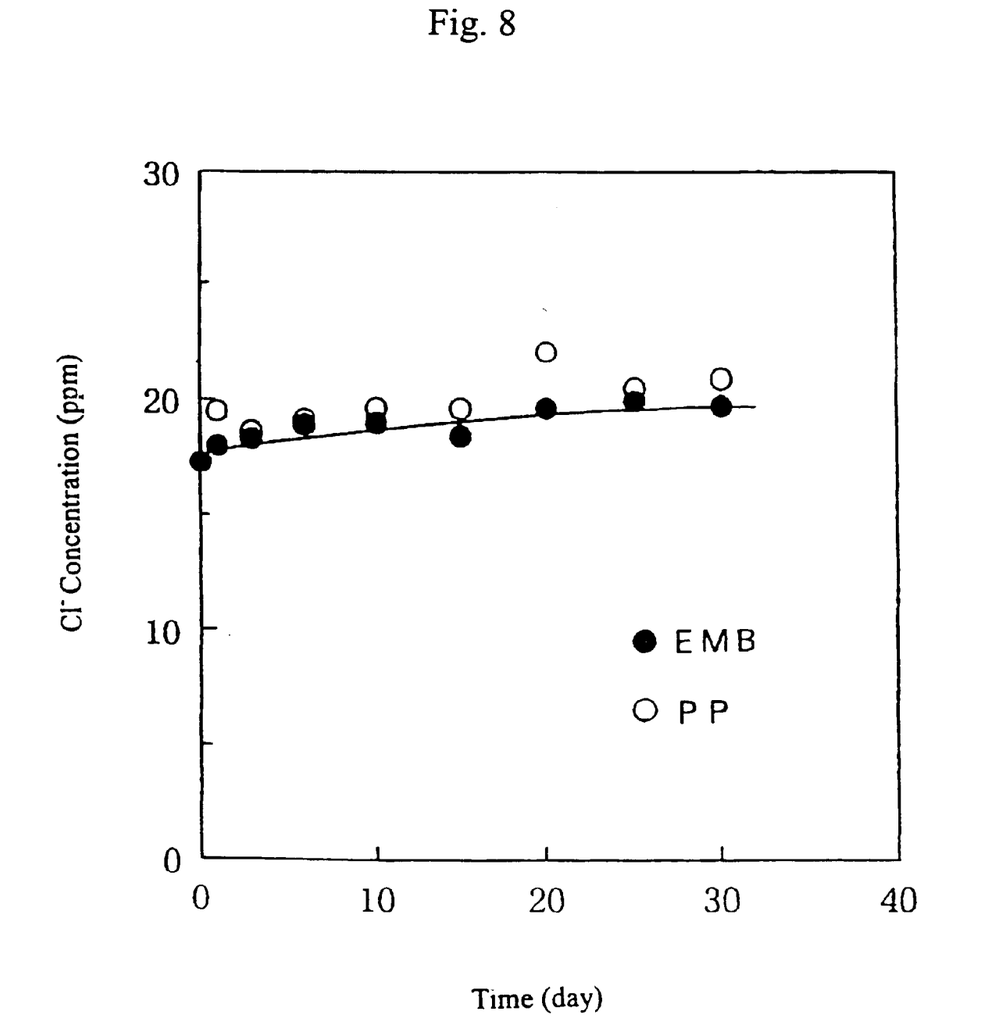
FIG. 8 is a graph showing the change over time in the chlorine ion concentration of the aqueous solution.

A tank was made from EMB (polyethylene) and another tank was made from ordinary polyethylene (PE). Both tanks were filled with tap water, and the change in the tap water chlorine ion concentration was measured after 1 day, 3 days, 7 days, 14 days and 30 days using an ion chromatograph (DX-500 manufactured by Nippon Dionex Co., Ltd.). The results are shown in FIG. 8. As the figure shows, the tap water chlorine ion concentration in both tanks hardly changed.

Conclusion

In these tests, the differences in the physical properties of the EMB and PP were examined. There were significant differences in melting point, hydrophobia, mechanical strength, electrical resistance, and insulation breakdown strength.

When a resin composition made with purified water with impurities removed or distilled water instead of EM-X water was tested, the physical properties of the EMB remained unchanged. The PP was likewise tested with three different kinds of waters. The physical properties of PP were not affected by the type of water used in its composition.

EXAMPLE 3

Storage Test on Fresh Produce

Test 1: Fresh kiwi fruits picked on the same day were placed in a polyethylene bag made from the resin composition using EM-X water (EMB) and in a store-bought polyethylene bag (PE). After storing the fruit for 7 days at 10° C. the amount of reduced Vitamin C (L-ascorbic acid) contained in the fruit was measured using high-performance liquid chromatography. The results are shown in Table 7. As shown in Table 7, the kiwi fruit stored in the polyethylene bag made from the resin composition lost less Vitamin C.

TABLE 7

Results of Reduced Vitamin C Measurement

| | Component Detected After Storage For Seven Days | | |
|---|---|---|---|
| | Initial Day | EMB | PE |
| Reduced Vitamin C | 66.6 | 54.4 | 42.9 |

Test 2: Here, the kiwi fruits in Test 1 were replaced by cherry tomatoes. After 7 days, the A mount of reduced Vitamin C (L-ascorbic acid) and the sugar content of the tomatoes were measured. The sugar content of the tomatoes was measured using a refractometer. The results are shown in Table 8. As shown in Table 8, the cherry tomatoes stored in the polyethylene bag made from the resin composition showed a smaller loss of Vitamin C and smaller gain of sugar content.

TABLE 8

Results of Reduced Vitamin C and Sugar Content Measurements

| | Component Detected After Storage For Seven Days | | |
|---|---|---|---|
| | Initial Day | EMB | PE |
| Reduced Vitamin C | 73.7 | 70.0 | 67.7 |
| Sugar Content | 6.0 | 8.2 | 7.5 |

Test 3: Here, the kiwi fruits in Test 1 were replaced by raw meat. After 7 days, the amount of acetic acid, acetone and 2,3-butanediol was measured. The measurements were performed using $^1$H-NMR. The results are shown in Table 9. As shown in Table 9, more acetic acid, acetone and 2,3-butanediol was detected in raw meat stored in the ordinary polyethylene bag. The presence of these chemicals accelerates the rate of putrefaction.

TABLE 9

Results of Concentration Measurements From Raw Meat

| | | Component Detected After Storage For Seven Days | |
|---|---|---|---|
| | Initial Day | EMB | PE |
| Acetic Acid | 0.2 | 0.5 | 2.1 |
| Acetone | 0 | 0.1 | 0.4 |
| 2,3-Butanediol | 0 | 0 | 2.3 |

Test 4: Here, the kiwi fruits in Test 1 were replaced by spinach. After 7 days, the amount of water released by the spinach was measured. The measurements were performed using $^1$H-NMR. The results are shown in Table 10. As shown in Table 10, more water was released from the spinach in the ordinary polyethylene bag. The amount of water released by the breakdown of spinach tissue is a good indicator of putrefaction. The amount of water in the polyethylene bag made from the resin composition of the present invention was essentially unchanged.

TABLE 10

Results From Measurements of Spinach Water

| | After Storage For Seven Days | |
|---|---|---|
| Initial Day | EMB | PE |
| 5.0 | 5.9 | 27.9 |

Test 5: A Tupperware container was made from the resin composition and an ordinary polyethylene container was purchased at a store. Bean sprouts were placed in these containers. After storing the containers for 7 days at 10° C., the contents were examined. The bean sprouts stored in the store-bought polyethylene container had begun to decay, whereas the bean sprouts stored in the container made from the resin composition were fresh and had actually grown.

Test 6: Here, the bean sprouts in Test 5 were replaced by shiitake mushrooms. After a week, the shiitake mushrooms stored in the store-bought polyethylene container had turned black, had become soft to the touch, and smelled of decay. The shiitake mushrooms stored in the container made from the resin composition, on the other hand, had hardly changed color. The mushrooms were still elastic to the touch and did not smell of decay.

It is clear from Tests 1 through 6 that fresh produce stored in the bags and containers made from the resin composition stay fresher longer than produce stored in ordinary polyethylene bags and containers.

Anti-Rust Effect of the Resin Compositions of the Present Invention

The resin composition of the present invention is ideal from the standpoint of preventing the putrefaction of fresh foods and improving mechanical strength. Also the antioxidizing substances (EM-X) in an embodiment of the resin composition of the present invention have been reported in a scholarly study to have a rustproofing effect. (See "Changes in the Weight of Metals Due to the Rustproofing Effect of Solutions Containing Effective Microorganism Fermentation Substances" by members of the Department of Science and Engineering at Nippon University and the Agricultural Department at Ryukyu University in the Technical Report of the Electronic Communication Society, Jun. 27, 1997, pp. 33–38.) In this study, it was reported that steel plates immersed in EM-X water did not experience a decrease in weight due to red rust. Therefore, resin compositions containing EM-X in the present invention also can be used to prevent metals from rusting. For example, the resin compositions of the present invention can be expected to both insulate and rustproof electrical wiring. If the resin compositions of the present invention are used to line pipes, the metal pipe can be expected to remain free of rust even if water gets between the metal pipe and the inner lining.

What is claimed is:

1. A resin composition, wherein a mixture of a thermoplastic resin in pellet or granular form and water is melted using heat and pressure under a subcritical condition of the water, and the melted resin is cooled, wherein the water includes antioxidizing substances produced by groups of effective microorganisms, and wherein the pressure is in a range of between 15 and 22 MPa.

2. The resin composition of claim 1, wherein the water is natural unchanged water.

3. The resin composition of claim 1 wherein the mixture is heated at a temperature of between 200 and 250° C.

4. The resin composition of claim 1, wherein the water is purified water or distilled water.

5. The resin composition according to claim 1, wherein the thermoplastic resin is polyethylene or polypropylene.

6. The resin composition according to claim 1, wherein the melted resin is cooled using cold water with impurities removed.

7. A method for manufacturing a resin composition comprising a first stage wherein a thermoplastic resin in pellet or granular form is mixed and stirred in water, and the water includes antioxidizing substances produced by groups of effective microorganism, a second stage wherein the mixture is heated using heat and pressure under a subcritical condition of the water and the thermoplastic resin is melted and the pressure is in a range of between 15 and 22 MPa, and a third stage wherein the melted resin obtained in the second stage is cooled.

8. The method for manufacturing a resin composition according to claim 7, wherein the water is natural unchanged water.

9. The method of manufacturing a resin composition according to claim 7, wherein the mixture is heated at a temperature of between 200 and 250° C.

10. The method for manufacturing a resin composition according to claim 7, wherein the water is purified water or distilled water.

11. The method according to claim 7, wherein the melted resin obtained in the second stage is cooled using cold water with impurities removed.

12. The method for manufacturing a resin composition according to claim 7, wherein the thermoplastic resin is polyethylene or polypropylene.

13. The resin composition of claim 3, wherein the composition is used to insulate and rustproof electrical wiring.

14. The resin composition of claim 3, wherein the composition is used to line pipes so that the pipes remain free of rust.

* * * * *